United States Patent
Papasakellariou

(10) Patent No.: US 11,758,564 B2
(45) Date of Patent: Sep. 12, 2023

(54) LATENCY REDUCTION FOR FLEXIBLE DUPLEX COMMUNICATION SYSTEMS

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 201 days.

(21) Appl. No.: 17/008,383

(22) Filed: Aug. 31, 2020

(65) Prior Publication Data
US 2021/0076387 A1    Mar. 11, 2021

Related U.S. Application Data

(60) Provisional application No. 62/897,769, filed on Sep. 9, 2019, provisional application No. 62/897,786, filed on Sep. 9, 2019.

(51) Int. Cl.
*H04W 72/53* (2023.01)
*H04W 52/14* (2009.01)
(Continued)

(52) U.S. Cl.
CPC .......... *H04W 72/53* (2023.01); *H04L 5/14* (2013.01); *H04W 52/143* (2013.01);
(Continued)

(58) Field of Classification Search
CPC ............................................. H04W 72/0493
See application file for complete search history.

(56) References Cited

U.S. PATENT DOCUMENTS

| 10,355,844 B2 | 7/2019 | Yang et al. |
| 2015/0124725 A1 | 5/2015 | Oizumi et al. |

(Continued)

FOREIGN PATENT DOCUMENTS

WO    2016/114593 A1    7/2016

OTHER PUBLICATIONS

International Search Report of the International Searching Authority dated Dec. 1, 2020 in connection with International Application No. PCT/KR2020/012084, 3 pages.
(Continued)

*Primary Examiner* — Abdeltif Ajid

(57) ABSTRACT

Methods and apparatuses for transmitting and receiving a physical uplink control channel (PUCCH) or a physical downlink control channel (PDCCH). A method of a UE includes receiving: a configuration for first PUCCH resources, or for first search space sets, on a first cell and a configuration for second PUCCH resources, or for second search space sets, on a second cell. The method further includes determining: a first PUCCH resource, or the first search space sets, on the first cell; a second PUCCH resource, or the second search space sets, on the second cell; and a condition. The method further includes transmitting the PUCCH using the first PUCCH resource, or receiving the PDCCH based on the first search space sets, when the condition is satisfied, and transmitting the PUCCH using the second PUCCH resource, or receiving the PDCCH based on the second search space sets, when the condition is not satisfied.

14 Claims, 10 Drawing Sheets

(51) Int. Cl.
*H04W 72/0446* (2023.01)
*H04W 72/0453* (2023.01)
*H04L 5/14* (2006.01)
*H04W 72/23* (2023.01)

(52) U.S. Cl.
CPC ... *H04W 72/0446* (2013.01); *H04W 72/0453* (2013.01); *H04W 72/23* (2023.01)

(56) References Cited

U.S. PATENT DOCUMENTS

| | | | |
|---|---|---|---|
| 2015/0358924 A1* | 12/2015 | Papasakellariou | H04W 52/346 370/329 |
| 2016/0242158 A1 | 8/2016 | Takeda et al. | |
| 2016/0285535 A1 | 9/2016 | Kim et al. | |
| 2016/0286558 A1 | 9/2016 | Chae et al. | |
| 2018/0084541 A1 | 3/2018 | Dinan | |
| 2019/0074935 A1* | 3/2019 | Babaei | H04L 1/1861 |
| 2019/0215871 A1* | 7/2019 | Aiba | H04W 48/16 |
| 2019/0230597 A1 | 7/2019 | Akkarakaran et al. | |
| 2020/0351891 A1* | 11/2020 | Hosseini | H04L 5/0055 |

OTHER PUBLICATIONS

"5G; NR; Physical channels and modulation (3GPP TS 38.211 version 15.6.0 Release 15)", ETSI TS 138 211 V15.6.0, Jul. 2019, 100 pages.

"5G; NR; Multiplexing and channel coding (3GPP TS 38.212 version 15.6.0 Release 15)", ETSI TS 138 212 V15.6.0, Jul. 2019, 106 pages.

"5G; NR; Physical layer procedures for control (3GPP TS 38.213 version 15.6.0 Release 15)", ETSI TS 138 213 V15.6.0, Jul. 2019, 110 pages.

"5G; NR; Physical layer procedures for data (3GPP TS 38.214 version 15.6.0 Release 15)", ETSI TS 138 214 V15.6.0, Jul. 2019, 108 pages.

"5G; NR; Medium Access Control (MAC) protocol specification (3GPP TS 38.321 version 15.6.0 Release 15)", ETSI TS 138 321 V15.6.0, Jul. 2019, 80 pages.

"5G; NR; Radio Resource Control (RRC); Protocol specification (3GPP TS 38.331 version 15.6.0 Release 15)", ETSI TS 138 331 V15.6.0, Jul. 2019, 516 pages.

Extended European Search Report dated Sep. 9, 2022 regarding Application No. 20862529.3, 9 pages.

* cited by examiner

LATENCY REDUCTION FOR FLEXIBLE DUPLEX COMMUNICATION SYSTEMS

CROSS-REFERENCE TO RELATED APPLICATIONS AND CLAIM OF PRIORITY

The present application claims priority to U.S. Provisional Patent Application No. 62/897,769, filed on Sep. 9, 2019 and U.S. Provisional Patent Application No. 62/897,786, filed on Sep. 9, 2019. The content of the above-identified patent document is incorporated herein by reference.

TECHNICAL FIELD

The present disclosure relates generally to wireless communication systems and, more specifically, the present disclosure relates to transmission of control channels in flexible duplex communication systems for reduced latency or improved coverage.

BACKGROUND

5th generation (5G) or new radio (NR) mobile communications are gathering increased momentum with worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

Various embodiments of the present disclosure provide to control channels for flexible duplex communication systems with reduced latency.

In one embodiment, a method for transmitting a physical uplink control channel (PUCCH) is provided. The method includes receiving: a configuration for first one or more PUCCH resources on a first cell and a configuration for second one or more PUCCH resources on a second cell. The method further includes determining: a first PUCCH resource from the first one or more PUCCH resources on the first cell, a second PUCCH resource from the second one or more PUCCH resources on the second cell, and a condition. The method also includes transmitting the PUCCH: using the first PUCCH resource when the condition is satisfied and using the second PUCCH resource when the condition is not satisfied.

In another embodiment, a user equipment (UE) is provided. The UE includes a transceiver configured to receive: a configuration for first one or more PUCCH resources on a first cell, and a configuration for second one or more PUCCH resources on a second cell. The UE also includes a processor configured to determine: a first PUCCH resource from the first one or more PUCCH resources on the first cell, a second PUCCH resource from the second one or more PUCCH resources on the second cell, and a condition. The transceiver is further configured to transmit the PUCCH: using the first PUCCH resource when the condition is satisfied, and using the second PUCCH resource when the condition is not satisfied.

In yet another embodiment, a base station is provided. The base station includes a transceiver configured to transmit: a configuration for first one or more PUCCH resources on a first cell, and a configuration for second one or more PUCCH resources on a second cell. The base station also includes a processor configured to determine: a first PUCCH resource from the first one or more PUCCH resources on the first cell, a second PUCCH resource from the second one or more PUCCH resources on the second cell, and a condition. The transceiver is further configured to receive the PUCCH: using the first PUCCH resource when the condition is satisfied, and using the second PUCCH resource when the condition is not satisfied.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.6.0, "NR; Physical channels and modulation;" 3GPP TS 38.212 v15.6.0, "NR; Multiplexing and Channel coding;" 3GPP TS 38.213 v15.6.0, "NR; Physical Layer Procedures for Control;" 3GPP TS 38.214 v15.6.0, "NR; Physical Layer Procedures for Data;" 3GPP TS 38.321 v15.6.0, "NR; Medium Access Control (MAC) protocol specification;" and 3GPP TS 38.331 v15.6.0, "NR; Radio Resource Control (RRC) Protocol Specification."

Figure 1:
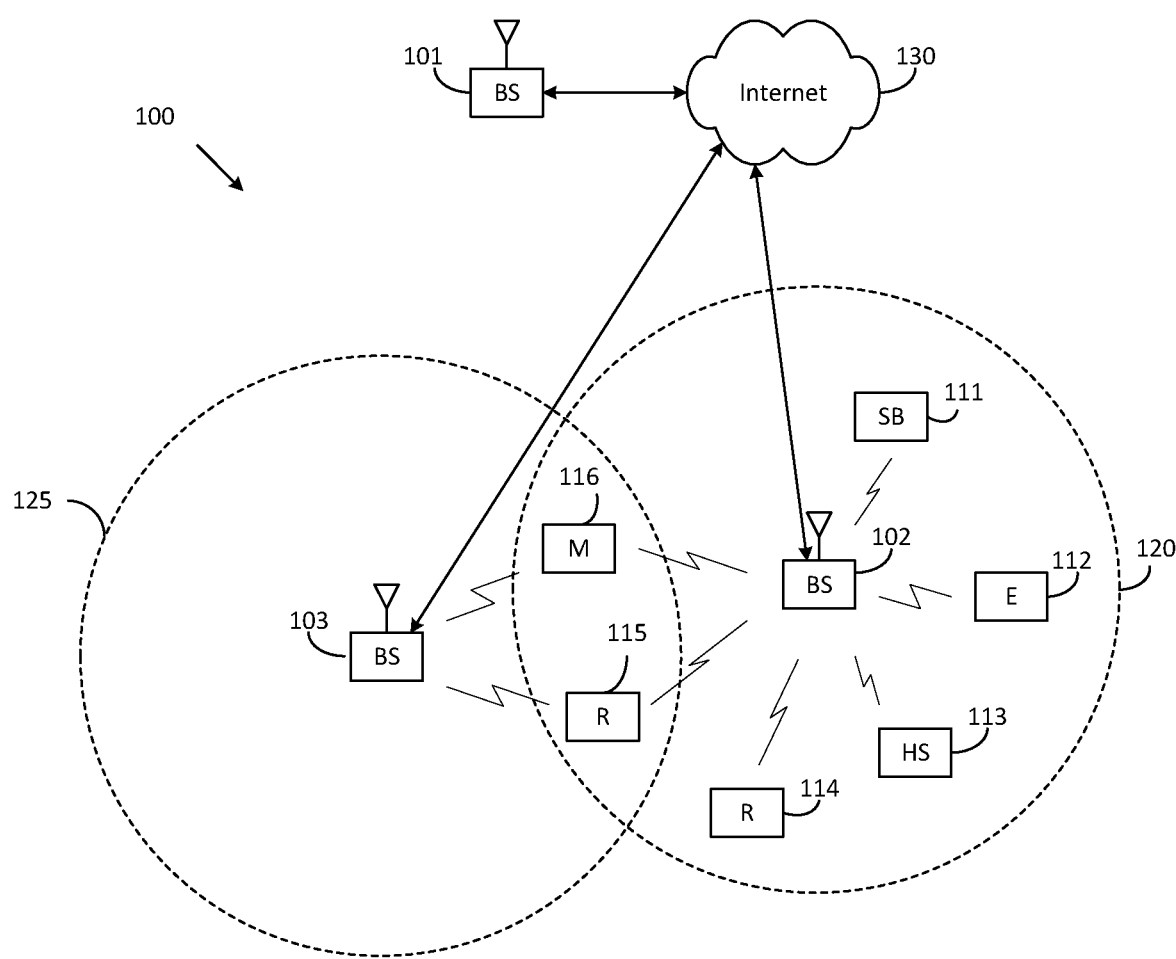
FIG. 1 illustrates an example wireless network according to embodiments of the present disclosure.
Figure 2:
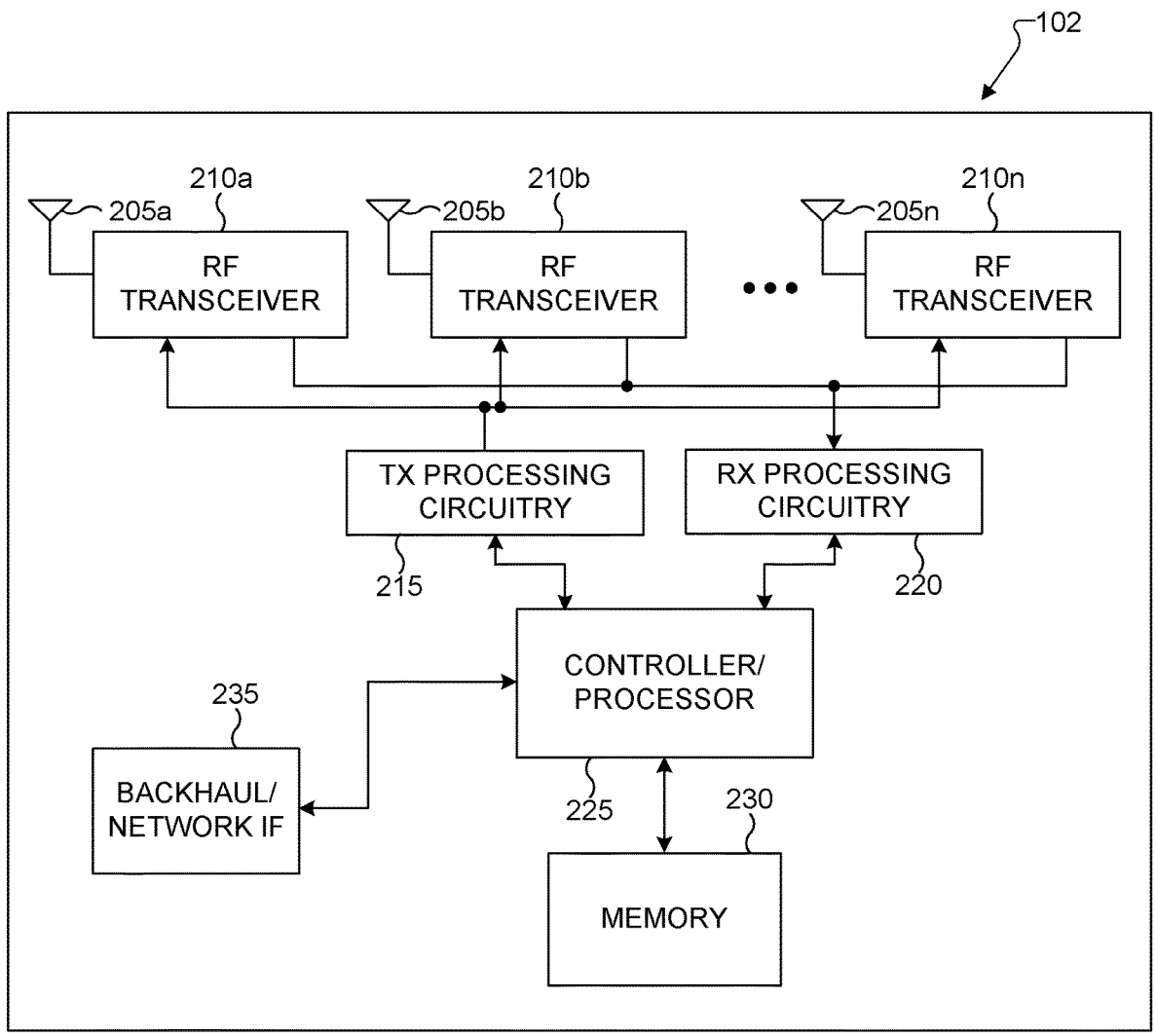
FIG. 2 illustrates an example gNB according to embodiments of the present disclosure.
Figure 3:
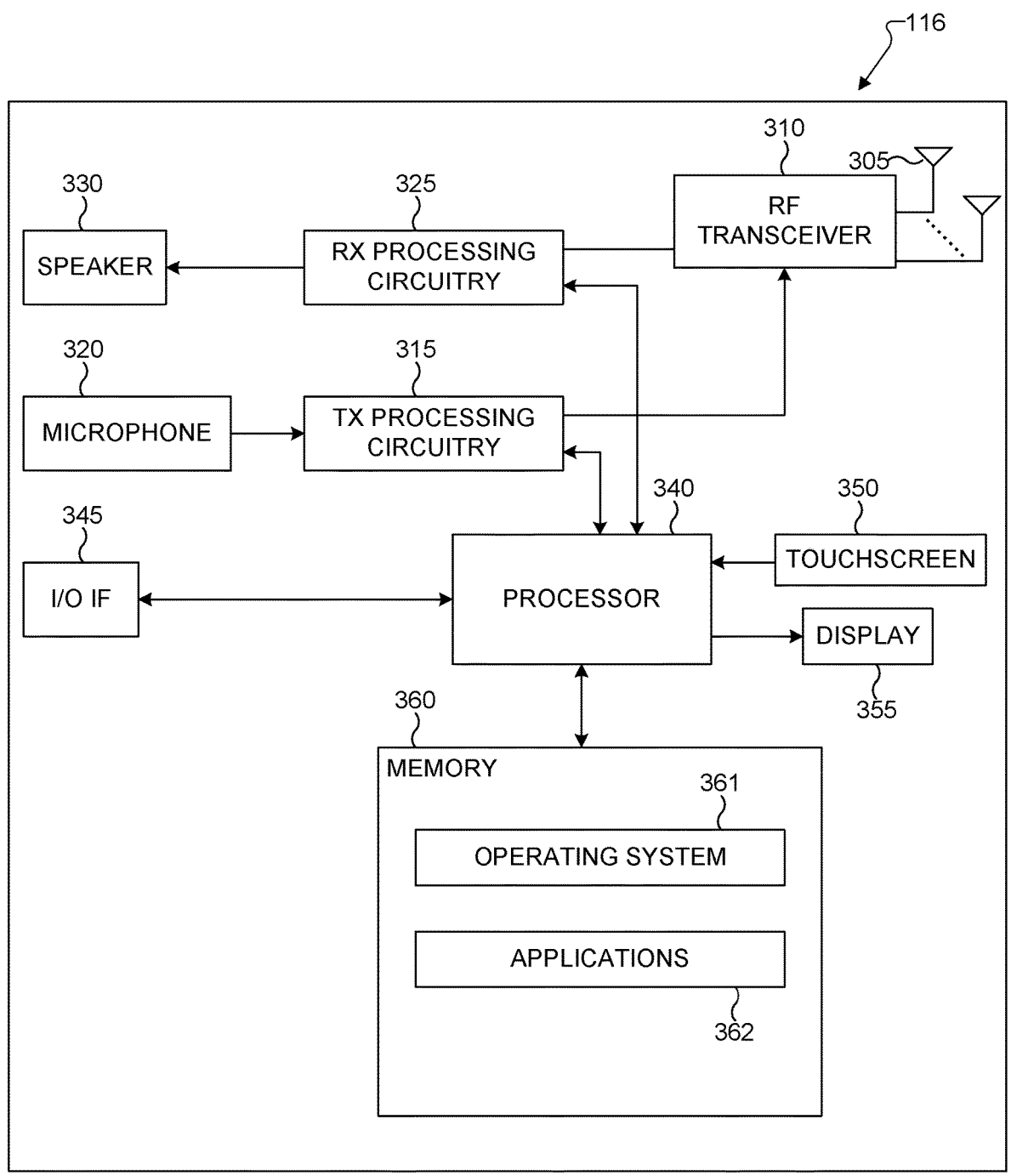
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for efficient flexible duplex communication operations in new radio systems. In certain embodiments, and one or more of the gNBs 101-103 includes circuitry, programing, or a combination thereof, for efficient flexible duplex communication in new radio systems.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems, efforts have been made to develop an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 60 GHz bands, so as to accomplish higher data rates or in lower frequency bands, such as below 6 GHz, to enable robust coverage and mobility support. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A communication system includes a downlink (DL) that refers to transmissions from a base station or one or more transmission points to UEs and an UL that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a PUSCH transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
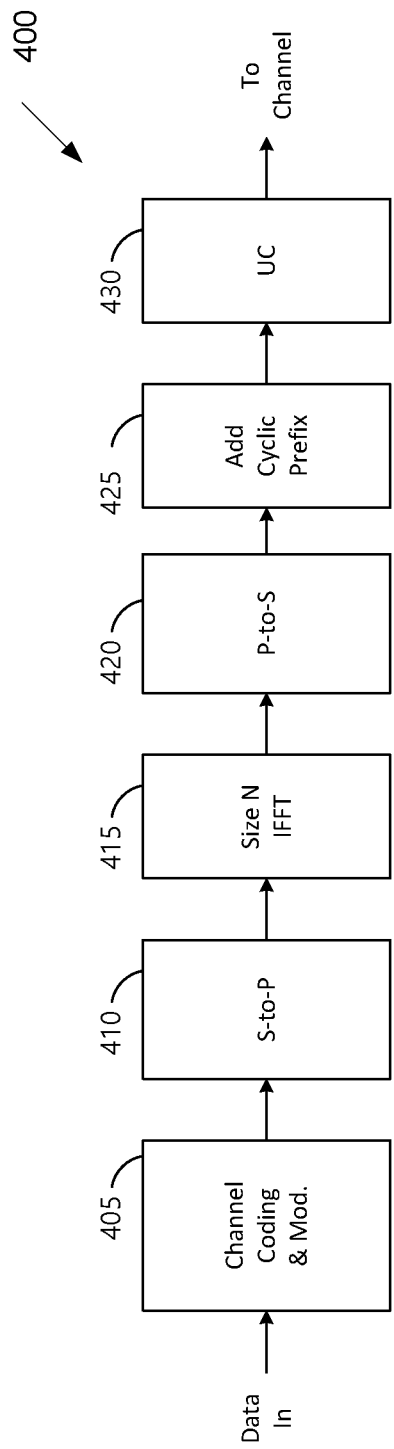
FIG. 4 illustrates an example DL slot structure according to embodiments of the present disclosure.
Figure 5:
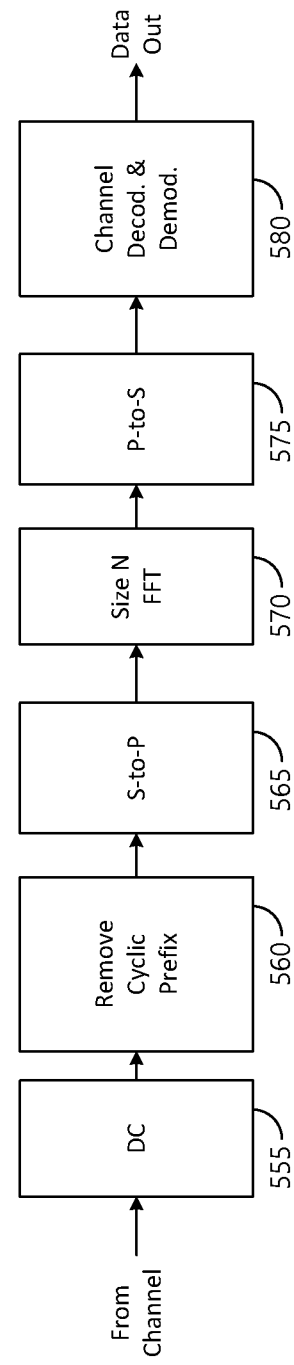
FIG. 5 illustrates an example UL slot structure for physical uplink (UL) shared channel (PUSCH) transmission or a PUCCH transmission according to embodiments of the present disclosure.

FIG. 4 and FIG. 5 illustrate example wireless transmit and receive paths according to this disclosure. In the following description, a transmit path 400 may be described as being implemented in an gNB (such as gNB 102), while a receive path 500 may be described as being implemented in a UE (such as UE 116). However, it will be understood that the receive path 500 can be implemented in an gNB and that the transmit path 400 can be implemented in a UE. In some embodiments, the receive path 500 is configured to control channels for flexible duplex communication systems with reduced latency as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to gNBs 101-103 and may implement the receive path 500 for receiving in the downlink from gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A hybrid slot includes a DL transmission region, a guard period region, and an UL transmission region, similar to a special subframe in NR specification. For example, a DL transmission region can contain PDCCH and PDSCH transmissions and an UL transmission region can contain PUCCH transmissions. For example, a DL transmission region can contain PDCCH transmissions and an UL transmission region can contain PUSCH and PUCCH transmissions.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective PUSCH or a PUCCH. A PUSCH or a PUCCH can be transmitted over a variable number of slot symbols including one slot symbol. The gNB can configure the UE to transmit signals on a cell within an UL bandwidth part (BWP) of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in a buffer, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, of a CSI-RS resource indicator (CRI) providing an index of a CSI-RS used to obtain the CSI report, and of a rank indicator (RI) indicating a transmission rank for a PDSCH.

UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a time-division duplexing (TDD) system, an SRS transmission can also provide a PMI for DL transmission. Additionally, in order to establish synchronization or an initial higher layer connection with a gNB, a UE can transmit a physical random access channel (PRACH) as shown in NR specifications).

Many frequency bands are flexible duplex bands where receptions by a UE (or transmissions from a gNB) and transmissions from the UE (or receptions by a gNB) are based on TDD. For example, most bands for 5G/NR are TDD bands. TDD operation offers some important advantages, such as using a same band for DL and UL transmissions leading to simpler UE implementation, for example as a duplexer is not required, and being able to exploit channel reciprocity between DL and UL to provide accurate link adaptation. However, TDD operation also has some important disadvantages such increased latency, because transmission/reception in a link direction (UL or DL) is not possible at all times, reduced data rates, and reduced coverage for a given latency compared to frequency-division duplexing (FDD).

To address some of the disadvantages for TDD operation, a dynamic adaptation of the link direction has been considered where, with the exception of some symbols in some slots supporting predetermined transmissions such as for synchronization signal/physical broadcast channel (SS/PBCH) blocks, symbols of a slot can have a flexible direction (UL or DL) that a UE can determine according to scheduling information for receptions or transmissions. For example, unless a UE is indicated by a DCI format a flexible symbol to be DL or unavailable, the UE can use the flexible symbol for a configured transmission. A control channel can also be used to provide a DCI format, such as DCI format 2_0 in NR specifications, that can indicate the link direction of flexible symbols in one or more slots and a UE can use that information to determine whether or not to transmit or receive in the flexible symbols. Nevertheless, in actual deployments, it is difficult for a gNB scheduler to adapt the transmission direction of symbols without coordination with other gNB schedulers in the network. This is because of cross-link interference (CLI) where, for example, UL transmissions on a cell can experience large interference from DL transmissions on a neighboring cell from a gNB.

Typical commercial deployments apply UL/DL partitioning of symbols in a slot that is either fixed or varies only over relatively large time scales compared to time scales for a transmission from a UE or a reception by a UE. The symbols in all slots in a predetermined number of slots have a same direction (UL or DL) with the exception of some slots that include symbols with both directions together with some flexible or reserved symbols to provide a guard period for DL-to-UL switching. This avoids the CLI problem but maintains the problems of increased latency and reduced coverage. Those problems have increased in significance due to the introduction of services requiring low latency, such as for industrial IoT in factory automation, and as new spectrum is on higher frequency bands where pathloss is larger leading to coverage reduction compared to spectrum in lower frequency bands.

One example to avoid both the CLI problem, and the latency and coverage problems of TDD operation, is to use carrier aggregation (CA), or carrier switching, or use a supplemental UL (SUL) carrier. For example, a UE can be configured with two cells in different frequency bands where an UL/DL configuration for symbols in a number of slots on a first cell is complementary (with the possible exception of a few symbols in some slots for DL-to-UL switching) to an UL/DL configuration of symbols in a number of slots on a second cell so that when a transmission direction on the first cell in a DL one, a transmission direction on the second cell in an UL one (and the reverse). In general, the UL/DL configurations on different cells can be such that a UE is enabled to transmit or receive on a first cell when the UE cannot transmit or receive on a second cell although that may not apply for all time instances as it is also possible for both the first and second cells to have at a same time DL symbols or UL symbols.

This enables a network to use a same UL/DL configuration of symbols across cells in each frequency band, thereby avoiding the CLI problem, while also enabling a UE to transmit or receive on the first cell or on the second cell practically at any time, thereby reducing or avoiding the problem of increased latency or reduced coverage. A UE need not necessarily be capable of CA operation as the UE is not required to simultaneously receive or transmit on more than one cell and then the UE can use carrier switching to transmit on the first cell or on the second cell. A similar functionality can be provided for UL transmissions using a complementary UL/DL configuration of symbols on an UL carrier and on a SUL carrier.

A number of functionalities need to be designed to enable or improve a UE operation with complementary UL/DL configuration on different cells or carriers.

For reception of PDCCHs, a UE capability to monitor a number of PDCCH candidates and perform channel estimation over a number of non-overlapping control channel elements (CCEs) is defined per combination of (X, Y) symbols where Y is a maximum number of symbols for control resource sets (CORESETs) where the UE receives the PDCCHs and X is a number of symbols between first symbols of successive CORESETs that are not within Y symbols. For example, for PDCCH monitoring occasions only over the first three symbols of a slot, a combination is defined as (X, Y)=(14, 3). For example, for PDCCH monitoring occasions over the first three symbols per half slot, a combination is defined as (X, Y)=(7, 3).

For a UE configured with a CA operation between two cells having complementary UL/DL configurations, it is beneficial to not require the UE to increase capability requirements for PDCCH monitoring compared to FDD operation with a single cell as, similar to FDD operation, the UE does not simultaneously receive PDCCH from the two cells.

PUCCH transmissions are on the primary cell (PCell) and, when the primary cell for a UE has two carriers, on the UL carrier (not on the SUL carrier). The primary cell has index 0 (smallest index of all cells configured to a UE). To reduce a latency for a PUCCH transmission and improve data rates for TB receptions by a UE, the PUCCH transmission can be extended to be on additional cells/carriers that use a complementary UL/DL configuration to the UL carrier on the primary cell or, in general, have available UL symbols when the UL carrier on the primary cell does not have available UL symbols. Then, the UE needs to be provided PUCCH resources on both cells, or on both UL and SUL carriers as, in order to reduce latency or improve coverage, the PUCCH transmission can be on any of two cells/carriers. The UE may also be able to determine an indication for a PUCCH transmission timing with HARQ-ACK information depending on the cell/carrier of the PUCCH transmission. Additionally, the UE needs to be able to determine a PUCCH transmission power according to the cell/carrier of the PUCCH transmission.

The UE can also transmit a PUSCH or a PUCCH with repetitions in order to improve a respective coverage. In order to avoid material increase in latency or reduction in data rates, the repetitions can be on different cells/carriers depending on the availability of symbols with UL direction on each cell/carrier.

Accordingly, various embodiments of the present disclosure recognize a need to enable a UE to determine a cell, from a group of cells, for the UE to transmit a PUSCH or a PUCCH. Various embodiments of the present disclosure also recognize another need to enable a UE to determine a transmission power for the PUSCH or the PUCCH on a cell from a group of cells. Various embodiments of the present disclosure also recognize another need to enable a UE to transmit repetitions of a PUSCH transmission or of a PUCCH transmission on different cells/carriers. Various embodiments of the present disclosure also recognize another need to enable a UE to operate with CA over two cells that use complementary UL/DL configurations without increasing a requirement for a UE capability for PDCCH monitoring. Various embodiments of the present disclosure also recognize another need to enable a UE to transmit PUCCH on more than one cell/carrier. Finally, various embodiments of the present disclosure recognize another need to enable a UE to transmit repetitions of a PUCCH transmission on different cells/carriers.

Various embodiments of the present disclosure enable a UE to determine a cell and a power for a PUSCH transmission or a PUCCH transmission on a cell from a group of cells, transmit repetitions of a PUSCH transmission or of a PUCCH transmission on different cells/carriers, and operate with CA over two cells that use at least partially complementary UL/DL configurations without increasing a requirement for a UE capability for PDCCH monitoring. Various embodiments of the present disclosure also enable a UE to transmit PUCCH on more than one cell/carrier. Finally, various embodiments of the present disclosure enable a UE to transmit repetitions of a PUCCH transmission on different cells/carriers.

For brevity, the following embodiments consider that a UE is configured with two cells and that the UE receives or transmits only on one of the two cells at a given time. Unless otherwise stated, for transmissions of channels or signals from the UE, the following embodiments are also applicable when the UE is configured with an SUL and the UE transmits only on one of the UL and the SUL at a given time or when the UE is configured with more than two cells having at least partially complementary UL/DL configurations.

In one embodiment, a UE is configured for CA operation over $N_{cells}^{DL,\mu}$ cells with active DL BWP having sub-carrier spacing (SCS) configuration $\mu$ and with $M_{cells,pair}^{DL,\mu_i,\mu_j}$ pairs of cells, wherein an active DL BWP of first cell in a pair of cells has SCS configuration $\mu_i$ and an active DL BWP of a second cell in the pair of cells has SCS configuration $\mu_j$. Each pair of cells from the $M_{cells,pair}^{DL,\mu_i,\mu_j}$ pairs of cells includes cells with different UL/DL configurations, such as a first cell on a first frequency band and a second cell on a second frequency band. The UL/DL configurations can be fully complementary or partially complementary.

The term fully complementary UL/DL configurations for a cell pair refers to the case that, with the exception of some symbols used for DL-to-UL switching, when a first symbol on the first cell has a DL direction, one or more symbols on the second cell that overlap in time with the first symbol on the first cell have an UL direction. The term partially complementary UL/DL configurations refers to the case that when a first symbol on the first cell has a DL direction, one or more symbols on the second cell that overlap in time with the first symbol on the first cell can have either a DL direction or an UL direction.

For generality, the following considers partially complementary UL/DL configurations on two cells. A particular realization of the general partially complimentary UL/DL configuration is the fully complementary UL/DL configuration.

In one embodiment, groups of cells are generalized with more than two cells, instead of pairs of cells, where the UE monitors PDCCH on only one cell from the group of cells during a PDCCH monitoring span. For example, having a group of cells, instead of a pair of cells, can provide additional resources for UL transmissions from a UE while allowing for more flexibility to a network to use partially complementary, and not fully complementary, UL/DL configurations for cells. For simplicity, the cell selection for PDCCH monitoring is subsequently described for a pair of cells.

To avoid requiring an increased PDCCH monitoring capability for a UE configured with two cells having complementary UL/DL configurations, the UE can be expected to monitor PDCCH only on one cell. For example, the UE can determine a cell from the two cells to monitor PDCCH according to the following.

In one example, when first one or more slots of a first cell overlap in time with second one or more slots of a second cell, and the first one or more slots do not include any PDCCH monitoring occasions for the UE, such as for example due to existence of UL symbols, and the second one or more slots include at least one PDCCH monitoring occasion for the UE, the UE monitors PDCCH on the second cell during the second one or more slots and does not monitor PDCCH on the first cell during the one or more slots.

In one example, when first one or more slots of a first cell overlap in time with second one or more slots of a second cell, and the first one or more slots include at least one PDCCH monitoring occasion for the UE, and the second one or more slots include at least one PDCCH monitoring occasion for the UE, the UE can be configured, or be specified in the system operation, to monitor PDCCH on one of: the cell with the smaller SCS configuration for the active DL BWP; the cell with the larger SCS configuration for the active DL BWP; in case the active DL BWPs of the first and second cells have same SCS configuration on the cell with the smaller index, on the cell with the smaller span Y for all search space sets, or on the cell with the larger span Y for the search space sets; the cell with the smaller index, regardless of the SCS configuration; and/or the cell with the smaller or larger span Y for the search space sets, regardless of the SCS configuration.

When first one or more slots of a first cell overlap in time with second one or more slots of a second cell, and the first one or more slots include at least one PDCCH monitoring occasion for the UE, and the second one or more slots include at least one PDCCH monitoring occasion for the UE, combinations of the above methods may also apply for a UE to determine a cell for PDCCH monitoring. For example, when a cell pair includes the primary cell, the UE monitors PDCCH on the primary cell. For example, when a cell pair does not include the primary cell, the UE monitors PDCCH on the cell with the smaller span gap.

Therefore, even though the UE is configured CA with two cells, the PDCCH monitoring capability for the UE can be that for one cell and the two cells can be considered as a single cell when determining a partitioning of the PDCCH monitoring capability of the UE (PDCCH candidates and number of non-overlapping CCEs) among cells.

After a UE determines, for each SCS configuration $\mu$, a number of $N_{cells,X}^{DL,\mu}$ cells where the UE does not monitor PDCCH in a slot, the UE determines a new number of cells $N_{cells}^{DL,\mu}$ where the UE monitors PDCCH in the slot as $N_{cells}^{DL,\mu} = N_{cells}^{DL,\mu} - N_{cells,X}^{DL,\mu}$. Then, for PDCCH monitoring and using the updated value of $N_{cells}^{DL,\mu}$, the UE is not required to monitor more than $M_{PDCCH}^{total,slot,\mu} = \lfloor N_{cells}^{cap} \cdot M_{PDCCH}^{max,slot,\mu} \cdot N_{cells}^{DL,\mu} / \Sigma_{j=0}^{3} N_{cells}^{DL,j} \rfloor$ PDCCH candidates or more than $C_{PDCCH}^{total,slot,\mu} = \lfloor N_{cells}^{cap} \cdot C_{PDCCH}^{max,slot,\mu} \cdot N_{cells}^{DL,\mu} / \Sigma_{j=0}^{3} N_{cells}^{DL,j} \rfloor$ non-overlapped CCEs per slot on the active DL BWP(s) of scheduling cell(s) from the $N_{cells}^{DL,\mu}$ downlink cells.

Figure 6:
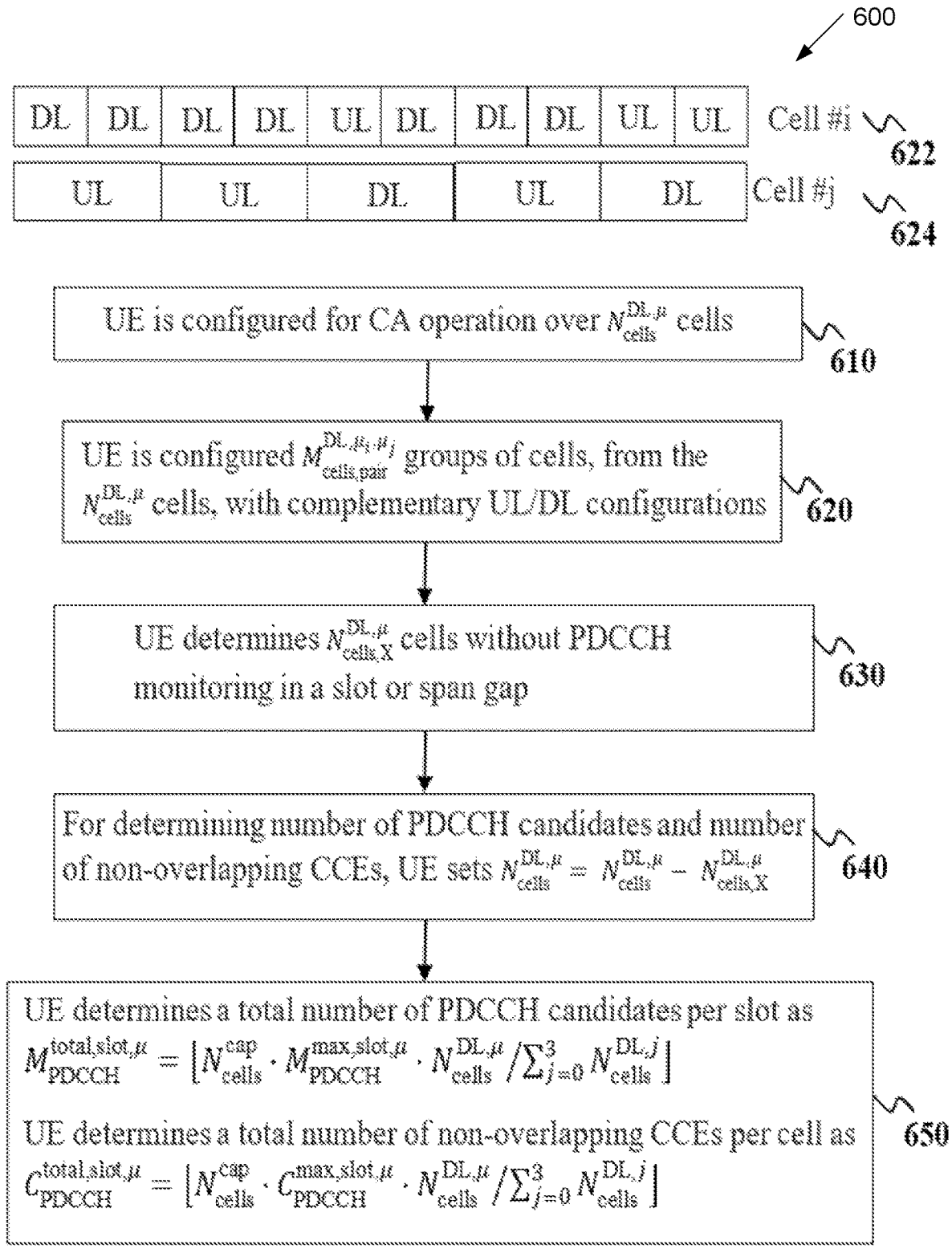
FIG. 6 illustrates an example UE procedure for CA operation according to embodiments of the present disclosure.

FIG. 6 illustrates an example UE procedure 600 for CA operation according to embodiments of the present disclosure. For example, the procedure 600 is for a UE configured for CA operation, that includes cell groups with partially complementary UL/DL configurations, to determine a total number of PDCCH candidates and a total number of non-overlapping CCEs for DL cells with SCS configuration $\mu$ according to this disclosure. An embodiment of the UE procedure 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 6, a UE is configured for CA operation over $N_{cells}^{DL,\mu}$ cells in step 610 that include $M_{cells,pair}^{DL,\mu_i,\mu_j}$ groups of cells, from the $N_{cells}^{DL,\mu}$ cells, with complementary UL/DL configurations in step 620. For example, a group of cells can include a first cell 622 and a second cell 624 with partially complementary UL/DL configurations. For SCS configuration $\mu$, the UE determines $N_{cells,X}^{DL,\mu}$ cells without PDCCH monitoring, for example in a slot, or generally in a span, according to one of the previously described conditions in step 630.

The UE then updates a number of DL cells for PDCCH monitoring as $N_{cells}^{DL,\mu} = N_{cells}^{DL,\mu} - N_{cells,X}^{DL,\mu}$ in step 640 and determines a total number of PDCCH candidates and a total number of non-overlapping CCEs for PDCCH monitoring on DL cells with SCS configuration $\mu$ as $M_{PDCCH}^{total,slot,\mu} = \lfloor N_{cells}^{cap} \cdot M_{PDCCH}^{max,slot,\mu} \cdot N_{cells}^{DL,\mu} / \Sigma_{j=0}^{3} N_{cells}^{DL,j} \rfloor$ and $C_{PDCCH}^{total,slot,\mu} = \lfloor N_{cells}^{cap} \cdot C_{PDCCH}^{max,slot,\mu} \cdot N_{cells}^{DL,\mu} / \Sigma_{j=0}^{3} N_{cells}^{DL,j} \rfloor$, respectively, in step 650.

In one embodiment, PUCCH transmissions from a UE on different cells of a same cell group or on different carriers of a same cell are provided. Enabling PUCCH transmissions from a UE on different cells/carriers when a UE operates on flexible duplex bands (TDD bands) enables increased data rates and reduced latency.

A UE can be configured more than one cell in a same cell group or more than one carrier of a same cell for PUCCH transmissions. The configuration can include separate configurations of PUCCH resources for each cell/carrier, for example as provided for the case of PUCCH transmissions on a single cell by higher layer parameter PUCCH-Config as known in NR specification.

When a UE detects a DCI format indicating a time unit, such as a slot, for a PUCCH transmission, the UE can determine a cell/carrier for the PUCCH transmission according to one of the following examples and/or embodiments or their combinations.

In one example, a DCI format, such as one scheduling a PDSCH reception or a SPS PDSCH release, includes a field indicating a cell/carrier for PUCCH transmission. For example, for a UE configured with 2 cells/carriers for PUCCH transmission, the field can include 1 bit while for a UE configured with 3 or 4 cells/carriers for PUCCH transmission, the field can include 2 bits.

In one example, when the UE is configured to transmit PUCCH on cells/carriers with non-overlapping time units for PUCCH transmissions, the UE can implicitly determine a cell/carrier for a PUCCH transmission based on the indicated timing of the PUCCH transmission and the indicated PUCCH resource. For example, when a DCI format scheduling a PDSCH reception to a UE indicates a third time unit, after the PDSCH reception, and a PUCCH resource for transmission by the UE of a PUCCH with HARQ-ACK information, and the PUCCH resource in the third time unit includes only UL symbols on a first cell and includes at least one DL symbol on the second cell, the UE transmits the PUCCH on the first cell.

In one example, when a UE is indicated, a time unit for a PUCCH transmission and a corresponding PUCCH resource includes only UL symbols on more than one cell/carrier, the UE can transmit the PUCCH on the cell/carrier based on a previous indication by higher layer signaling or according to a predetermined rule such as on the cell with the smaller index or on the UL carrier and not on the SUL carrier. For example, with reference to slots of PUCCH transmissions on the primary cell, when a UE receives in slot n a DCI format that schedules a PDSCH reception and indicates multiplexing of corresponding HARQ-ACK information in PUCCH transmission in slot n+k, the UE determines that the PUCCH transmission is (a) on the primary cell if the UE determines a PUCCH resource over only flexible or UL symbols in slot n+k on the primary cell or (b) on a secondary cell if the UE does not determine a PUCCH resource over only flexible or UL symbols in slot n+k on the primary cell and the UE determines a PUCCH resource over only flexible or UL symbols in slot n+k on the secondary cell. The number of flexible or UL symbols can also be required to be consecutive. When the primary cell and the secondary cell do not have a same slot duration (do not use a same subcarrier spacing configuration), the slot n+k on the secondary cell is a first slot that overlaps with slot n+k on the primary cell.

The aforementioned examples can also be applicable when a field indicating a cell/carrier for a PUCCH transmission is not included in a DCI format scheduling a PDSCH reception or a SPS PDSCH release, such as for example for a DCI format 1_0 when the contents and the size of DCI format 1_0 cannot be modified. Alternatively, for a DCI format 1_0, the PUCCH transmission can always be on the primary cell and an additional condition can be that the UE detects the DCI format 1_0 in a PDCCH that the UE receives according to a common search space.

When a UE is configured to transmit PUCCH on cells/carriers that have different SCS configurations, a time unit can be defined with respect to one of the SCS configurations such as for example with respect to the smaller SCS configuration (having the smaller subcarrier spacing and the larger symbol duration) or with respect to the SCS configuration of the primary cell. For example, when the UE is configured to transmit PUCCH on a first cell and on a second cell; the time unit is one slot; and the SCS configuration on the first cell is µ=0 (for example, corresponding to 15 kHz SCS and 1 msec slot duration) and the SCS configuration on the second cell is µ=1 (corresponding to 30 kHz SCS and 0.5 msec slot duration), the time unit is with respect to the slot duration on the first cell.

Figure 7:
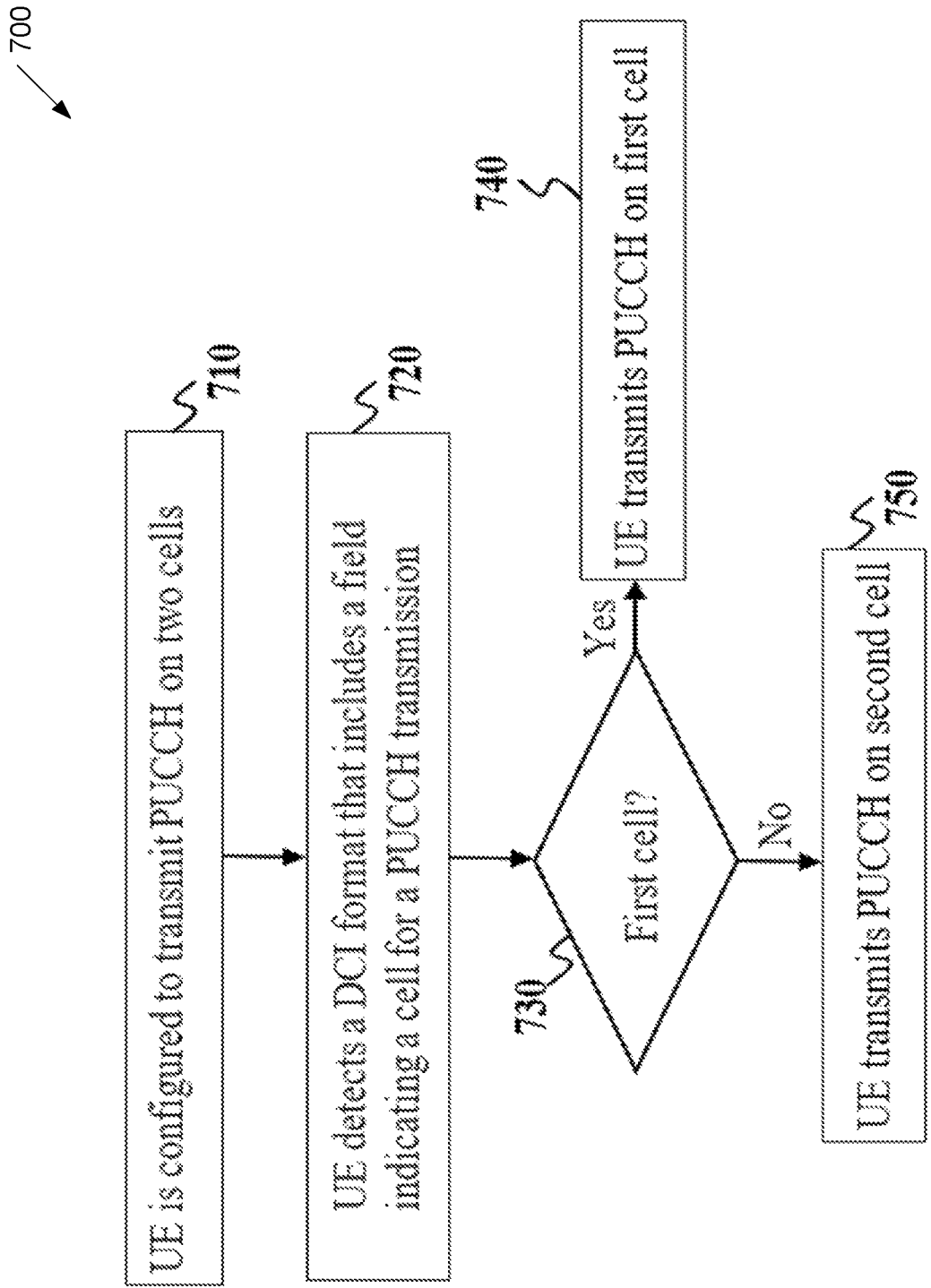
FIG. 7 illustrates an example UE procedure to transmit PUCCH according to embodiments of the present disclosure.

FIG. 7 illustrates an example UE procedure 700 to transmit PUCCH according to embodiments of the present disclosure. For example, the procedure 700 is for a UE configured to transmit PUCCH on two cells, or on two carriers of a cell, to determine a cell, or a carrier, for the PUCCH transmission based on an indication by a DCI format according to this disclosure. An embodiment of the UE procedure 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 7, a UE is configured to transmit PUCCH on two cells in step 710. The configuration can include a separate configuration of PUCCH resources on each of the two cells, and of other parameters related to UCI multiplexing on PUCCH and to determination of a PUCCH transmission power. The UE detects a DCI format that includes a field indicating a cell for a PUCCH transmission in step 720.

For example, the DCI format can be a DCI format 1_1 that schedules a PDSCH reception or a SPS PDSCH release for the UE and the PUCCH can include HARQ-ACK information in response to a decoding outcome of TBs in the PDSCH or in response to a detection of the SPS PDSCH release. For example, the field can include one bit where a binary "0" value indicates the first of the two cells (according to a cell index or according to a configuration) and a binary "1" indicates the second of the two cells. The UE determines whether the value of the field indicates the first cell in step 730. When the value of the field indicates the first cell, the UE transmits the PUCCH on the first cell in step 740; otherwise, the UE transmits the PUCCH on the second cell in step 750.

Figure 8:
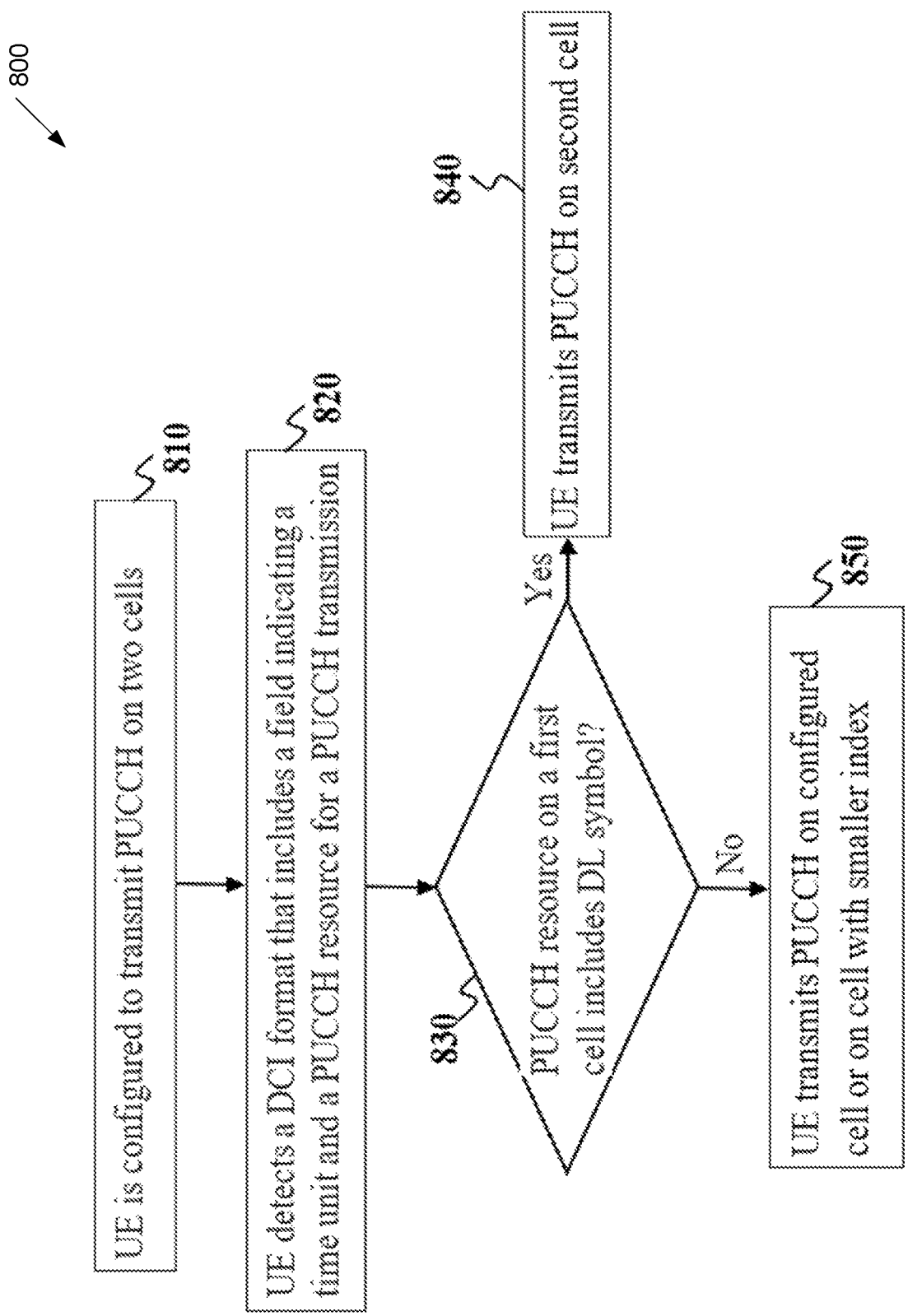
FIG. 8 illustrates another example UE procedure to transmit PUCCH according to embodiments of the present disclosure.

FIG. 8 illustrates another example UE procedure 800 to transmit PUCCH according to embodiments of the present disclosure. For example, the procedure 800 is for a UE configured to transmit PUCCH on two cells, or on two carriers of a cell, to determine a cell, or a carrier, for the PUCCH transmission based on a PUCCH transmission timing according to this disclosure. An embodiment of the UE procedure 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 8, a UE is configured to transmit PUCCH on two cells in step 810. The UE detects a DCI format that includes a field indicating a time unit and a PUCCH resource for a PUCCH transmission in step 820. For example, the time unit can be a slot of the cell with the smaller slot duration or a slot of the primary cell. The UE determines whether the PUCCH resource in the indicated time unit on a first cell of the two cells includes at least one DL symbol in step 830. When the PUCCH resource in the indicated time unit on a first cell of the two cells includes at least one DL symbol, the UE transmits the PUCCH on the second cell of the two cells in step 840. The UE does not expect the PUCCH resource to include at least one DL symbol on both cells. When the PUCCH resource in the indicated time unit on a first cell of the two cells does not include at least one DL symbol, the UE determines a cell from the two cells for a PUCCH transmission according to a prior configuration by higher layers for the case that an indicated PUCCH resource on both cells includes only UL symbols, or transmits the PUCCH on the cell from the two cells that has the smaller index in step 850, such as the primary cell.

Various embodiments of the present disclosure enable a UE to determine a cell, from a group of cells, for the UE to transmit a PUSCH or a PUCCH. Various embodiments of the present disclosure also enable a UE to determine a transmission power for the PUSCH or the PUCCH on a cell from a group of cells. Finally, various embodiments of the present disclosure a UE to transmit repetitions of a PUSCH transmission or of a PUCCH transmission on different cells/carriers.

In one embodiment, a determination by a UE is provided for a cell, from a group of cells, for a PUSCH transmission or for a PUCCH transmission.

A UE transmits a PUSCH in response to a DCI format detection scheduling the PUSCH transmission or in response to a higher layer configuration of transmission parameters. The latter is referred to as configured grant (CG) PUSCH transmission. A CG PUSCH transmission can be beneficial for several reasons including avoidance of overhead required to transmit PDCCHs providing DCI formats for scheduling PUSCH transmissions and reduction in latency as a UE does not need to first transmit a SR, and then detect a DCI format scheduling a PUSCH transmission before transmitting the PUSCH.

To minimize or reduce a latency of CG-PUSCH transmissions for operation in flexible duplex bands, a gNB can configure a UE with CG-PUSCH resources on more than one cell/carrier and a network can use complementary UL/DL configurations on the more than one cell so that the UE can transmit a CG-PUSCH substantially at any time. The configuration can include separate configurations of CG-PUSCH resources for each cell/carrier, for example as provided for the case of PUSCH transmissions on a single cell by higher layer parameter PUSCH-Config in NR specification.

Similar to CG-PUSCH transmissions, for PUCCH transmissions configured by higher layers, such as for PUCCH transmissions with periodic or semi-persistent CSI, SR, or HARQ-ACK information in response to SPS PDSCH receptions, a gNB can configure a UE with respective PUCCH resources on more than one cell so that, for a given periodicity of a PUCCH transmission with a UCI type, the UE can switch the PUCCH transmission to a cell other than a primary cell when at least one symbol of a respective PUCCH resource on the primary cell is not an UL symbol while the symbols of a respective PUCCH resource on a secondary cell are UL symbols. When there is no PUCCH resource in any cell without UL symbols, the UE can drop the PUCCH transmission or the UE can transmit the PUCCH in consecutive UL symbols of a PUCCH resource, when any, such as in the PUCCH resource on the primary cell.

Figure 9:
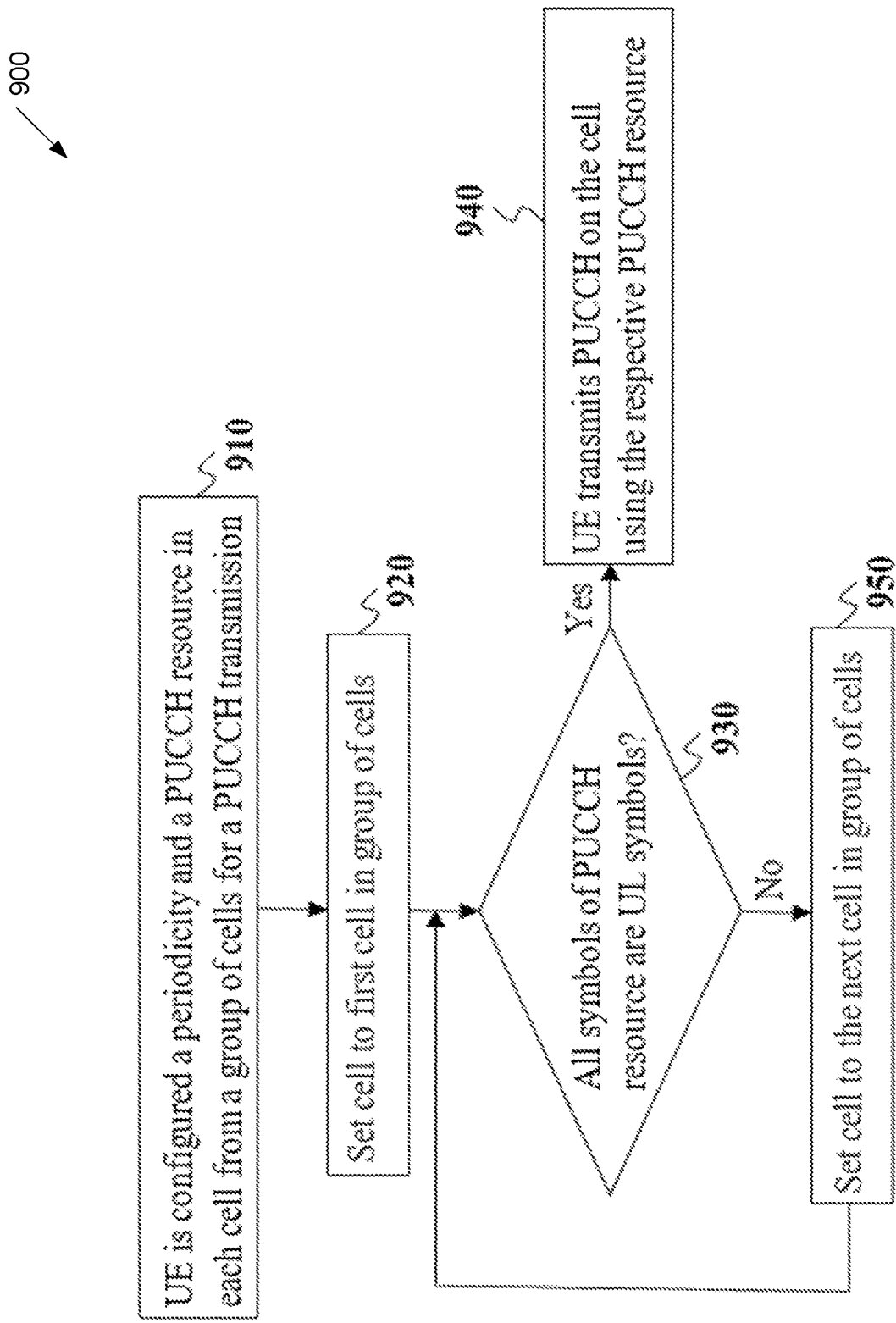
FIG. 9 illustrates an example UE procedure to determine a cell for a periodic/semi-persistent PUCCH transmission according to embodiments of the present disclosure.

FIG. 9 illustrates an example UE procedure 900 to determine a cell for a periodic/semi-persistent PUCCH transmission according to embodiments of the present disclosure. An embodiment of the UE procedure 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 9, a UE is configured a periodicity for a periodic/semi-persistent PUCCH transmission and a PUCCH resource in each cell from a group of cells in step 910. The UE can be additionally configured an offset for the PUCCH transmission. At a PUCCH transmission time occasion that the UE determines according to the periodicity and the offset (when provided) of the PUCCH transmission and for cells in the group of cells arranged in ascending order of a respective cell index, the UE sets the cell for PUCCH transmission to the first cell in step 920 and determines whether all symbols of the PUCCH resource are UL symbols in step 930. When all symbols of the PUCCH resource are the UL symbols, the UE transmits the PUCCH using the PUCCH resource on the cell in step 940. When all symbols of the PUCCH resource are not the UL symbols, the UE considers the next cell in the group of cells in step 950 and repeats step 930.

In one embodiment, a determination by a UE of a power is provided for periodic or semi-persistent PUCCH transmissions or for CG-PUSCH transmissions on a cell/carrier from more than one cell/carrier of a cell group.

In addition to a gNB providing a UE with CG-PUSCH resources or periodic/semi-persistent PUCCH resources on multiple cells, the gNB needs to provide to the UE means for the UE to determine a transmission power to adjust to channel fading so that a transmission power is neither too large to generate interference to neighboring cells nor too low for a reception reliability of data information or of UCI to be degraded. A UE determines a power for a CG-PUSCH or a PUCCH transmission using open loop power control components that adjust to a path-loss and a target reception power on each cell and using closed loop power control components that adjust to channel fading on each cell. Open loop power control components can be provided to the UE by the gNB through separate configurations of their values per cell, for example as described in the NR specifications. The UE can also measure a path-loss for determining a power for transmission on a cell, based on a reception of a RS, such as a CSI-RS, on the cell. It is also possible that a UE is configured a group of cells where the UE can assume a same path-loss, such as for example for intra-band cells, and then the UE can measure a path-loss based on a RS reception on one cell from the group of cells.

Closed loop power control components are transmission power control (TPC) commands that the gNB needs to provide to the UE frequently enough to adjust to variations in a channel fading the UE often experiences. For CG-PUSCH transmissions or for periodic/semi-persistent PUCCH transmissions, TPC commands are provided by a DCI format, such as for example a DCI format referred to as DCI format 2_2 in the NR specifications, having a cyclic redundancy check (CRC) scrambled by a TPC-PUSCH-RNTI or a TPC-PUCCH-RNTI, respectively. To enable a UE to determine a transmission power for a CG-PUSCH or a periodic/semi-persistent PUSCH on any cell where the UE is configured to transmit CG-PUSCH or periodic/semi-persistent PUCCH, the gNB needs to provide TPC commands per corresponding cell.

The gNB can configure the UE with a number of TPC commands for a corresponding number of cells with CG-PUSCH transmission in a DCI format scrambled with TPC-PUSCH-RNTI or with a number of TPC commands for a corresponding number of cells with periodic/semi-persistent PUCCH transmission in a DCI format scrambled with TPC-PUCCH-RNTI. The locations of the TPC commands can be consecutive in the DCI format in an ascending order of a corresponding cell index and only the location of the first TPC command (for the cell with the smallest index) needs to be provided. Each TPC command includes a same number of bits and the UE can therefore determine the location of a TPC command for a CG-PUSCH or PUCCH transmission on a corresponding cell other than the cell with the smallest index. Similar to path-loss determination, it is also possible that a UE is configured a group of cells where same TPC commands are applicable, such as for cells with adjacent spectrum, and the UE can determine a power of a PUCCH transmission (or a PUSCH transmission) based on a same sum of TPC command values (accumulative TPC command state) on any cell from the group of cells. For example, the UE can determine a power adjustment to make to a standard or predetermined transmission power based on the sum of the TPC command values and then determine the power of the transmission based on the power adjustment. A group of cells for which a UE can use a same path-loss measurement for determining a PUCCH transmission power on any cell from the group of cells can also be same as a group of cells for which the UE can use same TPC command values for determining the PUCCH transmission power. For example, a UE can determine a PUCCH transmission power (or a PUSCH transmission power) either on a primary cell or on a secondary cell using a same path-loss measurement and a same value for a sum of TPC command values.

Figure 10:
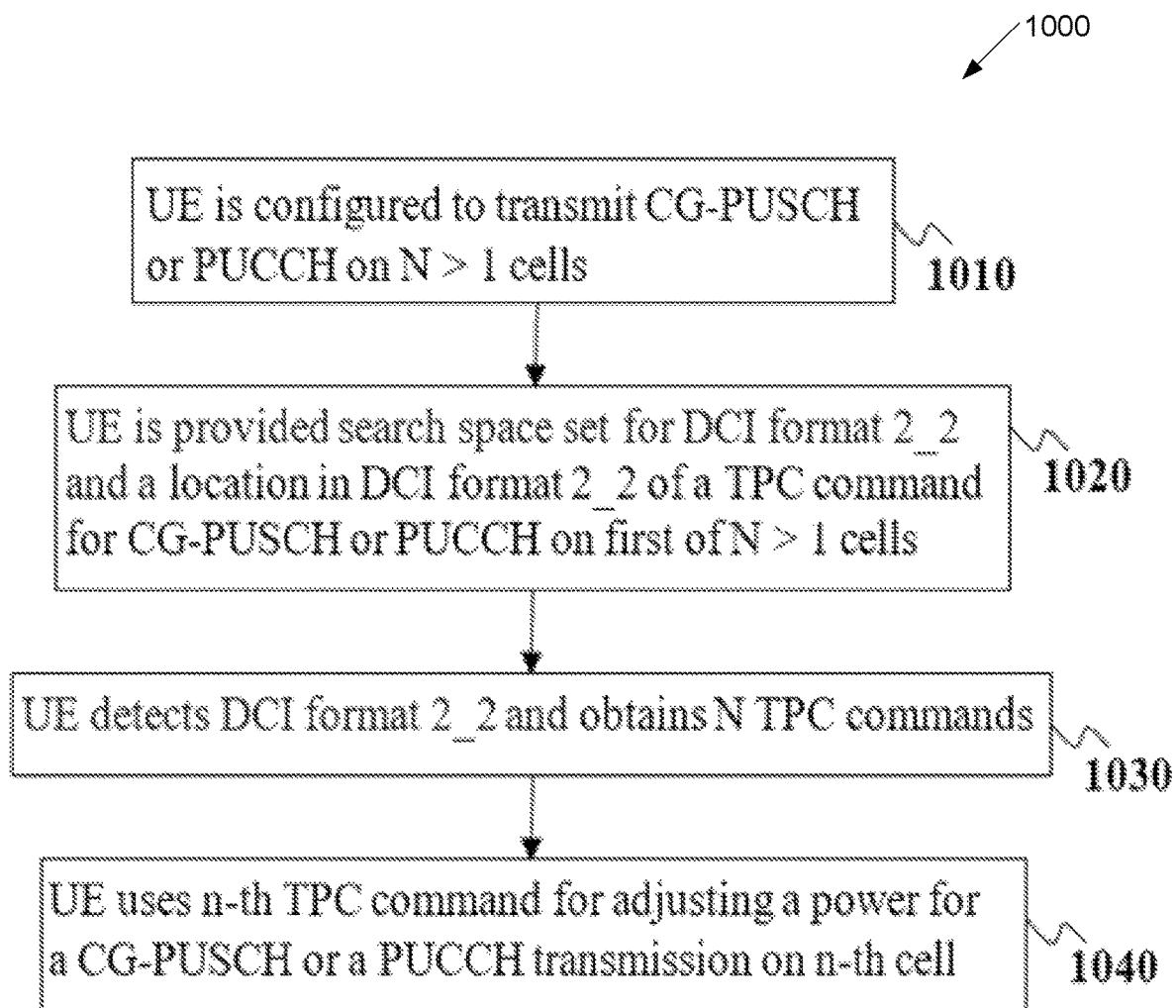
FIG. 10 illustrates an example UE procedure to determine a transmission power for a CG-PUSCH or a PUCCH on a cell from more than one cell the UE is configured to transmit CG-PUCCH or PUSCH according to embodiments of the present disclosure.

FIG. 10 illustrates an example UE procedure 1000 to determine a transmission power for a CG-PUSCH or a PUCCH on a cell from more than one cell the UE is configured to transmit CG-PUCCH or PUSCH according to embodiments of the present disclosure. An embodiment of the UE procedure 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 10, a UE is configured to transmit CG-PUSCH or PUCCH on N>1 cells in step 1010. The UE is provided search space sets to detect a DCI format 2_2 with CRC scrambled by a TPC-PUSCH-RNTI when DCI format 2_2 provides TPC commands for CG-PUSCH transmissions or by a TPC-PUCCH-RNTI when DCI format 2_2 provides TPC commands for CG-PUSCH transmissions and with a location in DCI format 2_2 of a TPC command for CG-PUSCH transmission or PUCCH transmission on the first of the N>1 cells in step 1020. The UE detects DCI format 2_2 and obtains N TPC commands in step 1030. The UE determines a n-th cell for transmitting a CG-PUSCH or a PUCCH and uses a n-th TPC command, from the N TPC commands, for adjusting a corresponding transmission power in step 1040. If the UE is configured by higher layers to apply a TPC command value for CG-PUSCH or PUCCH transmission on more than one cells from the group of cells, a number of TPC commands provided by DCI format 2_2 can be smaller than N and can be as small as one TPC command if the UE applies a same TPC command value for CG-PUSCH or PUCCH transmission on any cell from the group of cells.

In one embodiment, repetitions for a PUSCH transmission or for a PUCCH transmission on multiple cells are provided. For brevity, the following descriptions consider a PUSCH transmission with repetitions but same principles apply for a PUCCH transmission with repetitions. Further, for brevity, the following descriptions consider that a UE is configured with a group of more than one cell to select from for a repetition of a PUSCH transmission but same principles apply when the UE is configured with a group of more than one carrier of a cell or with a group of more than one cell and carrier of a cell. For brevity, a PUSCH transmission with repetitions is considered in the following but the embodiments are also directly applicable to a PUCCH transmission with repetitions.

A PUSCH transmission with repetitions can be scheduled to a UE from a gNB by a DCI format or can be configured by higher layers (e.g., CG-PUSCH). When the PUSCH transmission is scheduled by a DCI format, a number of repetitions can be indicated by a field in the DCI format, such as time domain resource allocation (TDRA) field or by a dedicated field, or can be provided to the UE in advance by higher layers. For a CG-PUSCH transmission, a number of repetitions can be provided by higher layers together with other parameters for the CG-PUSCH transmission.

When repetitions of a PUSCH transmission are on a single cell/carrier that operates in a flexible duplex frequency band, a repetition may not be possible for the UE to transmit when a number of symbols for the repetition, that is either indicated by a time domain resource allocation (TDRA) field in a DCI format or is provided by higher layers in case of a CG-PUSCH, does not include only UL symbols (of symbols with flexible transmission direction) and also includes DL symbols or reserved symbols. Then, the UE can either drop the repetition, leading to a worse reception reliability for the data information or UCI in the PUSCH, or postpone the repetition leading to increased latency and reduced data rates.

To circumvent the above problems, the gNB can configure the UE to transmit repetitions of a PUSCH transmission on multiple cells/carriers where the multiple cells/carriers use complementary UL/DL configurations so that when the symbols of a repetition do not include only UL (or flexible) symbols for a first cell/carrier, the symbols of the repetition include only UL (or flexible) symbols for a second cell/carrier.

When a gNB schedules to a UE a PUSCH transmission on a cell/carrier through a DCI format, wherein the PUSCH transmission is configured/indicated to be with repetitions and the UE is configured to select a cell/carrier from a group of more than one cell to transmit a repetition of the PUSCH transmission, the UE needs to determine respective time-frequency resources on a cell that the UE selects.

The DCI format indicates time-frequency resources with respect to the numerology of an indicated cell. The indicated cell can be same as the cell of the reception of the PDCCH providing the DCI format, in case of self-scheduling, or can be indicated by a carrier indicator field (CIF) in the DCI format in case of cross-carrier scheduling. A UE can expect that a first repetition for the PUSCH transmission can be on the cell indicated by the DCI format or can be on any cell from the group of cells.

For the cell indicated by the DCI format, a bandwidth and a duration for the PUSCH transmission can be respectively determined by a number of RBs and by a number of symbols indicated by the DCI format for the SCS of the cell. For a repetition of a PUSCH transmission on a cell other than the cell indicated by the DCI format, a determination by the UE and by the gNB of the time-frequency resources needs to be established.

In one example, the time-frequency resources for each repetition of a PUSCH transmission are the same, regardless of a SCS of a cell used for a repetition of the PUSCH transmission, and are indicated by the DCI format relative to the indicated cell of the PUSCH transmission.

Denoting by $\mu_i$ a SCS configuration for a cell with index i that is indicated by the DCI format and by $\mu_j$ a SCS configuration for a cell with index j that the UE selects for a repetition of the PUSCH transmission, a number of RBs for the repetition of the PUSCH transmission on cell j is $N_{RB,j}^{\mu_j} = (2^{\mu_j}/2^{\mu_i}) \cdot N_{RB,i}^{\mu_i}$. If $(2^{\mu_j}/2^{\mu_i}) \cdot N_{RB,i}^{\mu_i}$ can be a non-integer, then $N_{RB,j}^{\mu_j} = \lfloor (2^{\mu_j}/2^{\mu_i}) \cdot N_{RB,i}^{\mu_i} \rfloor$ or $N_{RB,j}^{\mu_j} = \lceil (2^{\mu_j}/2^{\mu_i}) \cdot N_{RB,i}^{\mu_i} \rceil$ where $N_{RB,i}^{\mu_i}$ is a number of RBs indicated by the DCI format.

A number of symbols for a repetition of the PUSCH transmission on cell j can be determined as is $N_{symbols,j}^{\mu_j} = (2^{\mu_j}/2^{\mu_i}) \cdot N_{symbols,i}^{\mu_i}$. If $(2^{\mu_j}/2^{\mu_i}) \cdot N_{symbols,i}^{\mu_i}$ can be a non-integer, then $N_{symbols,j}^{\mu_j} = \lfloor (2^{\mu_j}/2^{\mu_i}) \cdot N_{symbols,i}^{\mu_i} \rfloor$ or $N_{symbols,j}^{\mu_j} = \lceil (2^{\mu_j}/2^{\mu_i}) \cdot N_{symbols,i}^{\mu_i} \rceil$ where $N_{symbols,i}^{\mu_i}$ is a number of symbols indicated by the DCI format.

Figure 11:
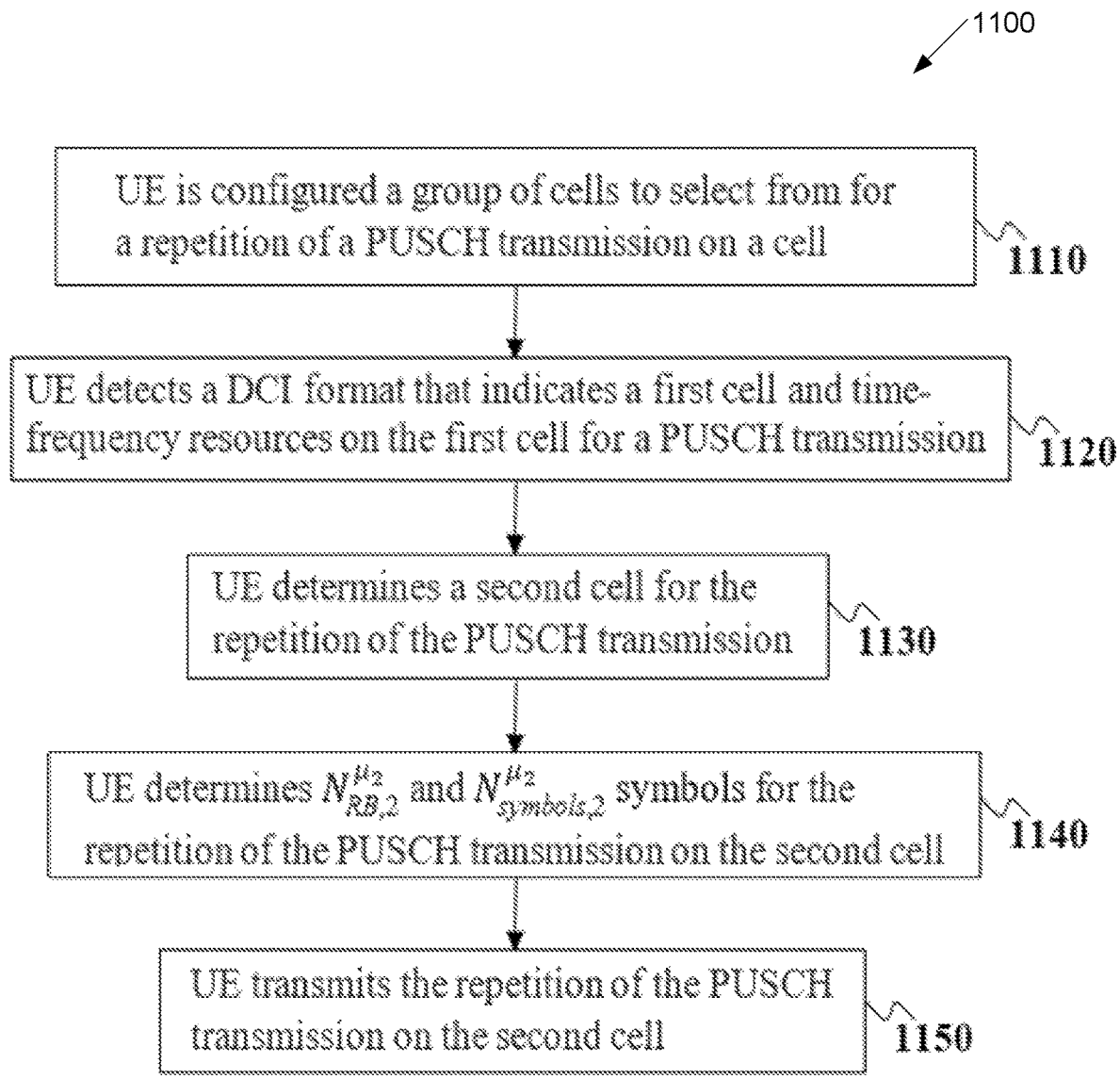
FIG. 11 illustrates an example UE procedure to determine time-frequency resources for a repetition of a PUSCH transmission according to embodiments of the present disclosure.

FIG. 11 illustrates an example UE procedure 1100 to determine time-frequency resources for a repetition of a PUSCH transmission according to embodiments of the present disclosure. For example, the procedure 1100 is for a UE to determine time-frequency resources for a repetition of a PUSCH transmission, wherein the PUSCH transmission is scheduled by a DCI format that indicates a first cell and the repetition of the PUSCH transmission is on a second cell, according to this disclosure. An embodiment of UE procedure 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 11, a UE is configured a group of cells to select from for a repetition of a PUSCH transmission on a cell in step 1110. The UE detects a DCI format in a PDCCH reception that schedules a PUSCH transmission and indicates a first cell and time-frequency resources on the first cell for the PUSCH transmission in step 1120. Alternatively, the UE can be configured by higher layers signaling parameters for a CG-PUSCH transmission and a corresponding cell. In case of self-carrier scheduling, the cell indication is implicit, and the first cell is same as the cell of the PDCCH reception. In case of cross-carrier scheduling, the cell indication is explicit and is provided by a CIF field in the DCI format. It is also possible that the first cell is configured in advance by higher layers and is independent of a cell of the PDCCH reception or of a cell indicated by a CIF field in the DCI format, when any.

The UE determines a second cell for a repetition of a PUSCH transmission in step 1130. The determination of the second cell can be based on an availability of a number of consecutive UL (or flexible) symbols on a cell and, in case such availability exists on multiple cells, the UE can select, for example, a cell with the smaller index from the multiple cells. The UE determines $N_{RB,2}^{\mu_2}$ RBs and $N_{symbols,2}^{\mu_2}$ symbols for the repetition of the PUSCH transmission on the second cell as $N_{RB,2}^{\mu_2} = (2^{\mu_1}/2^{\mu_2}) \cdot N_{RB,1}^{\mu_1}$ and $N_{symbols,2}^{\mu_2} = (2^{\mu_2}/$ $2^{\mu_1}) \cdot N_{symbols,1}{}^{\mu_1}$, respectively, where $N_{RB,1}{}^{\mu_1}$ and $N_{symbols,1}{}^{\mu_1}$ are a number of RBs and a number of symbols indicated by the DCI format, $\mu_1$ is the SCS configuration for the first cell and $\mu_2$ is the SCS configuration for the second cell in step 1140. The UE transmits the repetition of the PUSCH transmission on the second cell over $N_{RB,2}{}^{\mu_2}$ RBs and over $N_{symbols,2}{}^{\mu_2}$ symbols in step 1150. The described determination for the number of RBs and the number of symbols on each cell results to a bandwidth and a duration of each repetition being substantially same on the first cell and on the second cell.

In one example, a number of RBs and a number of symbols for each repetition of a PUSCH transmission are same, regardless of a SCS of a cell used for a repetition of the PUSCH transmission, and are indicated by the DCI format. When a first repetition is on a first cell using a first SCS configuration and a second repetition is on a second cell using a second SCS configuration, the second repetition is over a different bandwidth/number of RBs and over a different number of symbols than the first repetition when a SCS configuration on the first cell is different than a SCS configuration on the second cell.

In one example, a reference SCS configuration $\mu_{ref}$ for repetitions of a PUSCH transmission is provided to a UE by higher layer signaling. A UE can determine a number of RBs and a number of symbols for a repetition of a PUSCH transmission on a cell using SCS configuration $\mu_2$ as in the aforementioned examples and/or embodiments by replacing $\mu_1$ with $\mu_{ref}$.

In one example, a combination of the previous examples and/or embodiments can apply. For example, for a repetition of a PUSCH transmission on a cell, a UE can determine a number of RBs as in the aforementioned examples and/or embodiments and determine a number of symbols as in the aforementioned examples and/or embodiments.

The aforementioned examples and/or embodiments can also apply for a CG-PUSCH transmission where, instead of an indication for a number of RBs, a number of symbols, and a cell for the PUSCH transmission being provided to a UE by a DCI format, the corresponding indication is provided to the UE by higher layers.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for transmitting a physical uplink control channel (PUCCH), the method comprising:
    receiving:
        a configuration for first one or more PUCCH resources on a first cell,
        a configuration for second one or more PUCCH resources on a second cell, and
        a downlink control information (DCI) format that includes a field with a value indicating the first cell or the second cell, wherein the first cell and the second cell are in a same group of cells with associated control information provided by a same PUCCH;
    determining:
        a first PUCCH resource from the first one or more PUCCH resources on the first cell when the value indicates the first cell,
        a second PUCCH resource from the second one or more PUCCH resources on the second cell when the value indicates the second cell; and
    transmitting the PUCCH:
        using the first PUCCH resource when the value indicates the first cell, and
        using the second PUCCH resource when the value indicates the second cell.

2. The method of claim 1, wherein the first cell is a primary cell and the second cell is a secondary cell.

3. The method of claim 1, wherein all symbols of the first PUCCH resource and of the second PUCCH resource are flexible symbols or uplink symbols.

4. The method of claim 1, further comprising:
    transmitting the PUCCH with a number of repetitions,
    a first repetition of the PUCCH uses the first PUCCH resource, and
    a second repetition of the PUCCH uses the second PUCCH resource.

5. The method of claim 1, further comprising:
    receiving a downlink control information (DCI) format that includes a first field providing a first transmit power control (TPC) command values and a second field providing a second TPC command value;
    determining a first power adjustment based on the first TPC command value;
    determining a second power adjustment based on the second TPC command value;
    determining one of:
        a power based on the first power adjustment when the value indicates the first cell, or
        a power based on the second power adjustment when the value indicates the second cell; and
    transmitting the PUCCH with the determined power.

6. A user equipment (UE) comprising:
    a transceiver configured to receive:
        a configuration for first one or more physical uplink control channel (PUCCH) resources on a first cell,
        a configuration for second one or more PUCCH resources on a second cell, and
        a downlink control information (DCI) format that includes a field with a value indicating the first cell or the second cell, wherein the first cell and the second cell are in a same group of cells with associated control information provided by a same PUCCH; and
    a processor configured to determine:
        a first PUCCH resource from the first one or more PUCCH resources on the first cell when the value indicates the first cell,
        a second PUCCH resource from the second one or more PUCCH resources on the second cell when the value indicates the second cell;
    wherein the transceiver is further configured to transmit the PUCCH:
        using the first PUCCH resource when the value indicates the first cell, and
        using the second PUCCH resource when the value indicates the second cell.

7. The UE of claim 6, wherein the first cell is a primary cell and the second cell is a secondary cell.

8. The UE of claim 6, wherein all symbols of the first PUCCH resource and of the second PUCCH resource are flexible symbols or uplink symbols.

9. The UE of claim 6, wherein:
the transceiver is further configured to transmit the PUCCH with a number of repetitions,
a first repetition of the PUCCH uses the first PUCCH resource, and
a second repetition of the PUCCH uses the second PUCCH resource.

10. The UE of claim 6, wherein:
the transceiver is further configured to receive a downlink control information (DCI) format that includes a first field providing a first transmit power control (TPC) command value and a second field providing a second TPC command value;
the processor is further configured to:
 determine a first power adjustment based on a sum of the TPC command value, determine a second power adjustment based on the second TPC command value, and
 determine one of:
  a power based on the first power adjustment when the value indicates the first cell, or
  a power based on the second power adjustment when the value indicates the second cell; and
the transceiver is further configured to transmit the PUCCH with the determined power.

11. A base station comprising:
a transceiver configured to transmit:
 a configuration for first one or more physical uplink control channel (PUCCH) resources on a first cell,
 a configuration for second one or more PUCCH resources on a second cell, and
 a downlink control information (DCI) format that includes a field with a value indicating the first cell or the second cell, wherein the first cell and the second cell are in a same group of cells with associated control information provided by a same PUCCH; and
a processor configured to determine:
 a first PUCCH resource from the first one or more PUCCH resources on the first cell when the value indicates the first cell,
 a second PUCCH resource from the second one or more PUCCH resources on the second cell when the value indicates the second cell,
wherein the transceiver is further configured to receive the PUCCH:
 using the first PUCCH resource when the value indicates the first cell, and
 using the second PUCCH resource when the value indicates the second cell.

12. The base station of claim 11, wherein the first cell is a primary cell and the second cell is a secondary cell.

13. The base station of claim 11, wherein all symbols of the first PUCCH resource and of the second PUCCH resource are flexible symbols or uplink symbols.

14. The base station of claim 11, wherein:
the transceiver is further configured to receive the PUCCH with a number of repetitions,
a first repetition of the PUCCH uses the first PUCCH resource, and
a second repetition of the PUCCH uses the second PUCCH resource.

\* \* \* \* \*